US006024529A

United States Patent [19]

Kristensen

[11] Patent Number: 6,024,529

[45] Date of Patent: Feb. 15, 2000

[54] VACUUM BASED LIFTER DEVICE FOR DISPLACEMENT OF AN ARTICLE

[75] Inventor: Axel Kristensen, Langesund, Norway

[73] Assignee: Hegna Lift AS, Brevik, Norway

[21] Appl. No.: 09/051,037

[22] PCT Filed: Oct. 9, 1996

[86] PCT No.: PCT/NO96/00235

§ 371 Date: Mar. 31, 1998

§ 102(e) Date: Mar. 31, 1998

[87] PCT Pub. No.: WO97/13718

PCT Pub. Date: Apr. 17, 1997

[30] Foreign Application Priority Data

Oct. 11, 1995 [NO] Norway .................................... 954035

[51] Int. Cl.[7] .............................. B65G 65/24; B66F 9/18

[52] U.S. Cl. ......................... 414/607; 294/65; 294/86.41; 414/627

[58] Field of Search .................................... 414/607, 619, 414/620, 627, 420, 421, 425, 422; 294/65, 86.41, 64.1

[56] References Cited

U.S. PATENT DOCUMENTS

| | | | |
|---|---|---|---|
| 2,929,523 | 3/1960 | Cushman | 414/619 |
| 2,942,745 | 6/1960 | Horton | 414/627 |
| 3,219,380 | 11/1965 | Carliss | 414/627 X |
| 3,314,559 | 4/1967 | Horton | 414/627 |
| 3,332,715 | 7/1967 | Hickman et al. | 414/620 X |
| 3,435,973 | 4/1969 | Dickey | 414/607 |
| 3,549,031 | 12/1970 | Blood et al. | 414/620 X |
| 3,923,177 | 12/1975 | Horton | 414/627 |
| 4,318,661 | 3/1982 | Helm | 414/607 |
| 4,618,306 | 10/1986 | Dorsch | 414/607 X |
| 4,789,295 | 12/1988 | Boucher, Jr. et al. | 414/607 X |
| 5,306,110 | 4/1994 | Cline | 414/607 X |
| 5,421,685 | 6/1995 | Elmer et al. | 294/65 X |
| 5,516,254 | 5/1996 | Gessler | 414/607 |
| 5,791,861 | 8/1998 | Seelig | 414/627 |

FOREIGN PATENT DOCUMENTS

| | | | |
|---|---|---|---|
| 1208247 | 12/1965 | Germany | 414/627 |
| 160 198 | 2/1984 | Norway . | |
| 457 078 | 11/1988 | Sweden . | |
| 461 588 | 3/1990 | Sweden . | |

*Primary Examiner*—David A. Bucci
*Attorney, Agent, or Firm*—Barry R. Lipsitz; Ralph F. Hoppin

[57] ABSTRACT

A vacuum based lifter device is provided for displacement of an article. At least one suction plate or suction cup is designed for connection to and disconnection from a vacuum source. The suction plate or suction cup is secured to equipment in order to be able to move it together with or relative to the article which is to be displaced. The device has a pallet-like structure into which fork members mounted on a fork-lift truck can be inserted. Parts of the structure define a vacuum chamber, a vacuum source having an electrically driven vacuum pump provided on the pallet-like structure and pneumatically connected to the vacuum chamber, and a mechanically or electrically controllable stop and release valve. The release valve is pneumatically coupled between the vacuum chamber and the suction plate or suction cup.

14 Claims, 3 Drawing Sheets

VACUUM BASED LIFTER DEVICE FOR DISPLACEMENT OF AN ARTICLE

BACKGROUND OF THE INVENTION

The present invention relates to a vacuum based lifter device for displacement of an article, where at last one suction plate or suction cup is designed to be connected to and disconnected from a vacuum source, and where the suction plate or suction cup is secured to equipment in order that it can be moved together with or relative to said articles which are to be displaced. As an alternative, the invention relates furthermore to a solution where the equipment is secured to a support structure which can be introduced onto fork members mounted on a working unit, e.g., a fork-lift truck.

Although the present invention is illustrated and described in particular in connection with the lifting of barrels, such as oil barrels, it will immediately be understood that the device is just as suitable for lifting other types of articles, e.g., flat articles, such as plates.

The invention is intended especially to be used in connection with fork-lift trucks which are to load and unload articles, and possibly transport and empty barrels.

For some enterprises it is often difficult and laborious to be able to handle articles and perhaps handle them in connection with stands, shelves or similar.

The lifting devices which are found on the market today have attachment means which make utilisation in different types of work situations impossible. There are, e.g., barrel lifters which grip the ring of the barrel, but are only capable of horizontal displacement. There are also types which grip around the barrel with two arms.

Furthermore, the use of a clamp strap around the barrel is known whereby it is possible to turn the barrel, but a solution of this kind is cumbersome in use. Nor can it be used to place, e.g., the barrel on a stand or on a shelf.

For many years different types of lifting tackle have been made for articles of different shapes, e.g., barrels. Today there are several types of such lifters for barrels or other circular articles where both vertical and horizontal movement is made possible. The German firm Hoffmann Industribau has a hydraulic barrel lifter with two arms which can be pressed together. This device makes possible both vertical and horizontal lifting, but the arms are not suitable for placing of barrels on a stand, shelf or similar.

The German manufacturer Bauer is well-known for its various lifting tackle. To lift barrels a known so-called “nose clip” is used which can grip the barrel ring, but only permits vertical lift. Other means from the same manufacturer have, e.g., a clamp strap which grips around the barrel, whereby both vertical and horizontal movement are made possible, but this solution is not suitable for placing a barrel on a stand or shelf either.

It has also become evident that the lifters which are on the market today can only be used for one or two types of operation, and that consequently the field of application is too small, thus making the lifters too cumbersome and also costly to use. There is a lifter having two arms and which uses hydraulics, where the lifter must be connected to the fork-lift truck system. Known lifters of this type are also too heavy to be practical in use.

Other known devices can be seen from, e.g., German Offenlegungsschrift 2354899, 3515954 and US Pat. No. 4,978,269.

SUMMARY OF THE INVENTION

None of the solutions taught in these publications are particularly useful for simple use together with a fork-lift truck.

The objective of the present invention is thus to provide a device of the type mentioned above, and where the drawbacks associated with the prior art are overcome, according to the invention in that the device has a pallet-like structure into which fork members mounted on a working unit, e.g., a fork-lift truck, can be inserted, and where parts of the structure define a vacuum chamber, a vacuum source with an electrically driven vacuum pump provided on the said pallet-like structure and pneumatically connected to the vacuum chamber, and a mechanically or electrically controllable stop and release valve which is pneumatically coupled between the vacuum chamber and said suction plate or suction cup.

In the alternative solution, according to the invention, the device is characterised in that the support structure is of a pallet-like design, that parts of the structure form a vacuum chamber, that a vacuum source with electrically driven vacuum pump is provided on the pallet-like structure and is pneumatically connected to the vacuum chamber and that a mechanically or electrically operated stop and release valve is pneumatically coupled between the vacuum chamber and said suction plate or suction cup.

According to a further embodiment of the device according to the invention, the pallet-like structure has first and second tubular members wherein the fork members of said working unit can be inserted, third and fourth tubular members connecting the respective adjacent ends of said first and second tubular members, and a fifth tubular member which pneumatically connects said third and fourth members. Furthermore, the vacuum chamber of the vacuum source is defined by said third, fourth and fifth tubular members and is pneumatically connected to the vacuum pump. The power supply for the vacuum pump motor is provided in the form of an accumulator on said structure or is provided by cable connection to the working unit.

Furthermore, there is a means for controlling the motor which operates the vacuum pump, said means being provided on the pallet-like structure. In addition, there is a means for controlling the valve, and this means is also located on the pallet-like structure.

According to a further embodiment of the device, a hand-operated control device forming a connection, e.g., via electric cable or wirelessly, having electric or electronic control equipment located on the pallet-like structure and where said control device is designed to actuate the operation of the valve or the operation of a motor which drives the vacuum pump.

BRIEF DESCRIPTION OF THE DRAWINGS

The use of a wireless connection can take place by means of radio signals or infrared signals.

The invention will now be explained in more detail with reference to the attached drawings, wherein.

DETAILED DESCRIPTION OF THE INVENTION

In the case of the present vacuum based lifter device for displacement of an article, such as a barrel or a plate, it is essential to be able to be as independent as possible of external connections to the vacuum source and any power supply.

What is achieved with the present device is that it can be used for the majority of work situations, including loading and unloading articles, such as barrels or plates, and also transporting and emptying barrels, and placing articles such as barrels or plates on a stand or shelf, and where the device does not use power before some time after the article has been gripped by suction onto the device.

In the description below, importance has been attached to describing FIGS. 1 and 2 together as the major differences reside only in the shape of the suction plates or suction cups which are to be used, depending upon what type of articles are to be moved.

Figure 4:
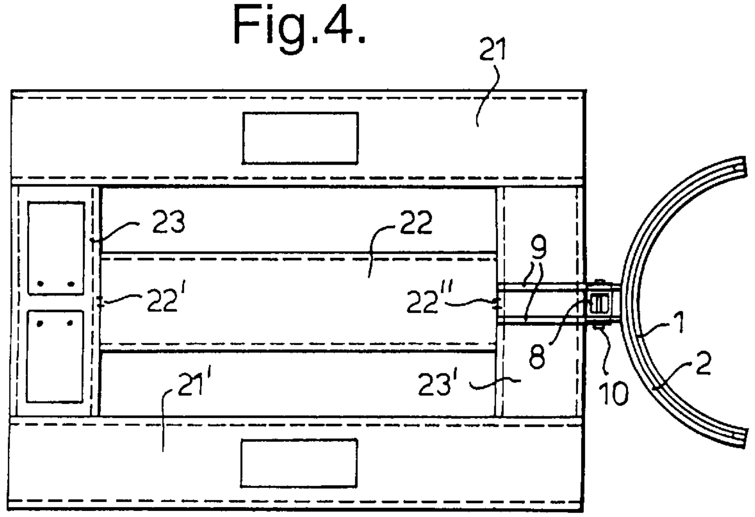
FIG. 4 shows the device according to the invention, seen from above and essentially in accordance with FIG. 1.

As can be seen from FIG. 4, the vacuum chamber is defined by two tubular members 23, 23', which are connected by means of a tubular member 22, and where there are pneumatic connections 22' and 22" between the tubular member 22 and the members 23 and 23'. Furthermore, there are additional tubular members 21 and 21' designed to receive forks 30, 30' on a working unit 31, e.g., a fork-lift truck.

The pallet-like structure is equipped with a vacuum pump 17 which either manually or automatically can be connected and disconnected in order to sustain a predetermined vacuum level in the vacuum chamber 22, 23, 23'. Under normal operational conditions the vacuum pump will be able to maintain the desired vacuum in the vacuum chamber for a short running time, e.g., 5 to 10 seconds and at considerably greater intervals, e.g., 5 minutes.

Practical tests have shown that a vacuum based lifter of this type requires such short intervals of use of the vacuum pump that the power source 16 which is also mounted on the pallet-like structure, e.g., a regular accumulator battery, can be used for a long time before it needs replacing or charging. During normal use one charge will last for several days' use, although this is dependent upon how many lifting operations are carried out per day and how great the total running time of the vacuum pump is.

As an alternative to power source 16, power may be supplied from a working unit 38 by means of a cable 37.

The present device is equipped with a two-way stop and release valve 5 which is electrically operated and is provided with a return mechanism. The valve may for instance be a solenoid valve of the type supplied by the firm Bürkert.

When the valve 5 is supplied with power one end thereof will be closed. When the power is cut off, the return spring in the valve will open the other end of the valve 5.

Figure 1:
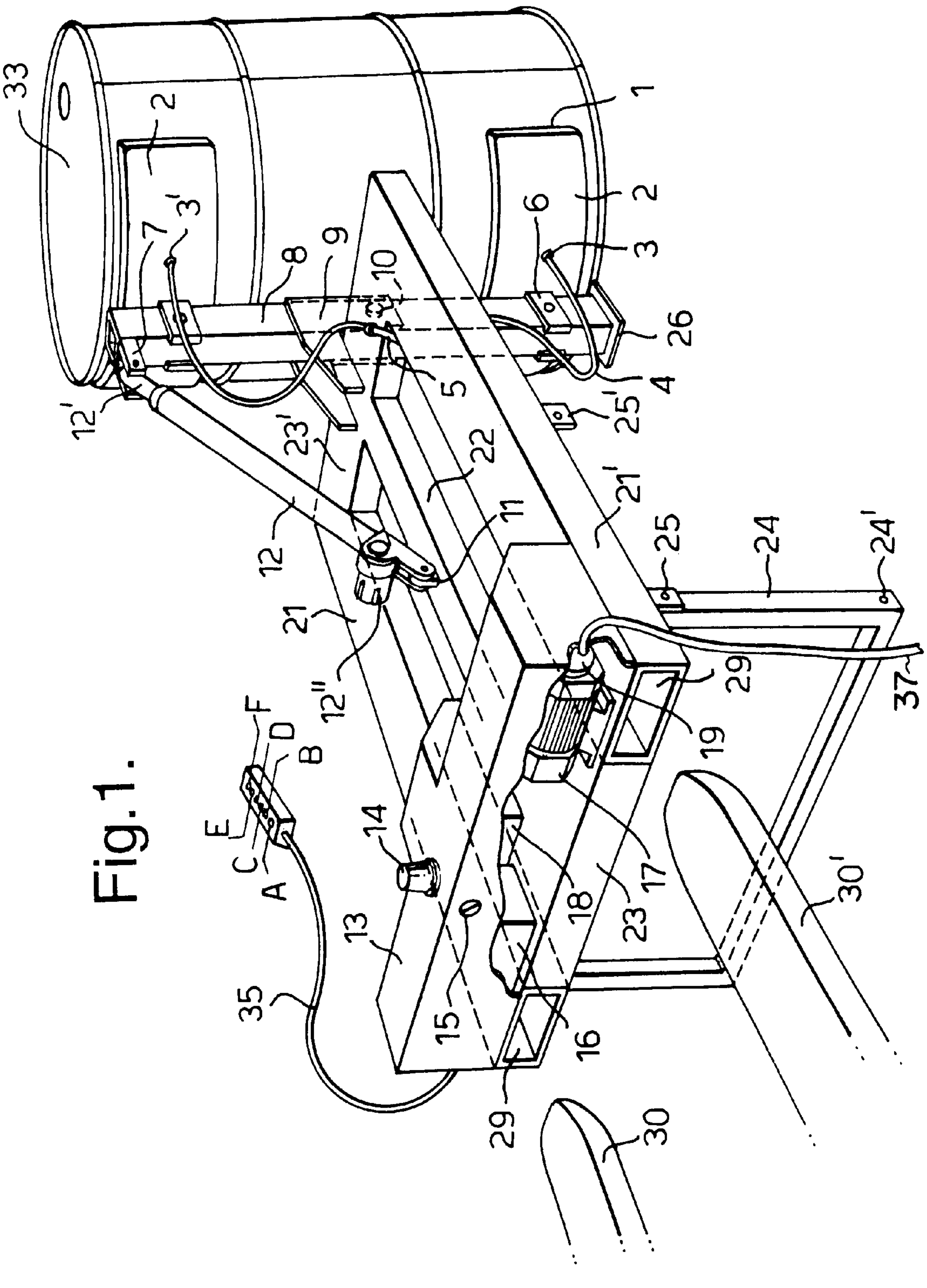
FIG. 1 shows a first embodiment of the device according to the invention.
Figure 2:
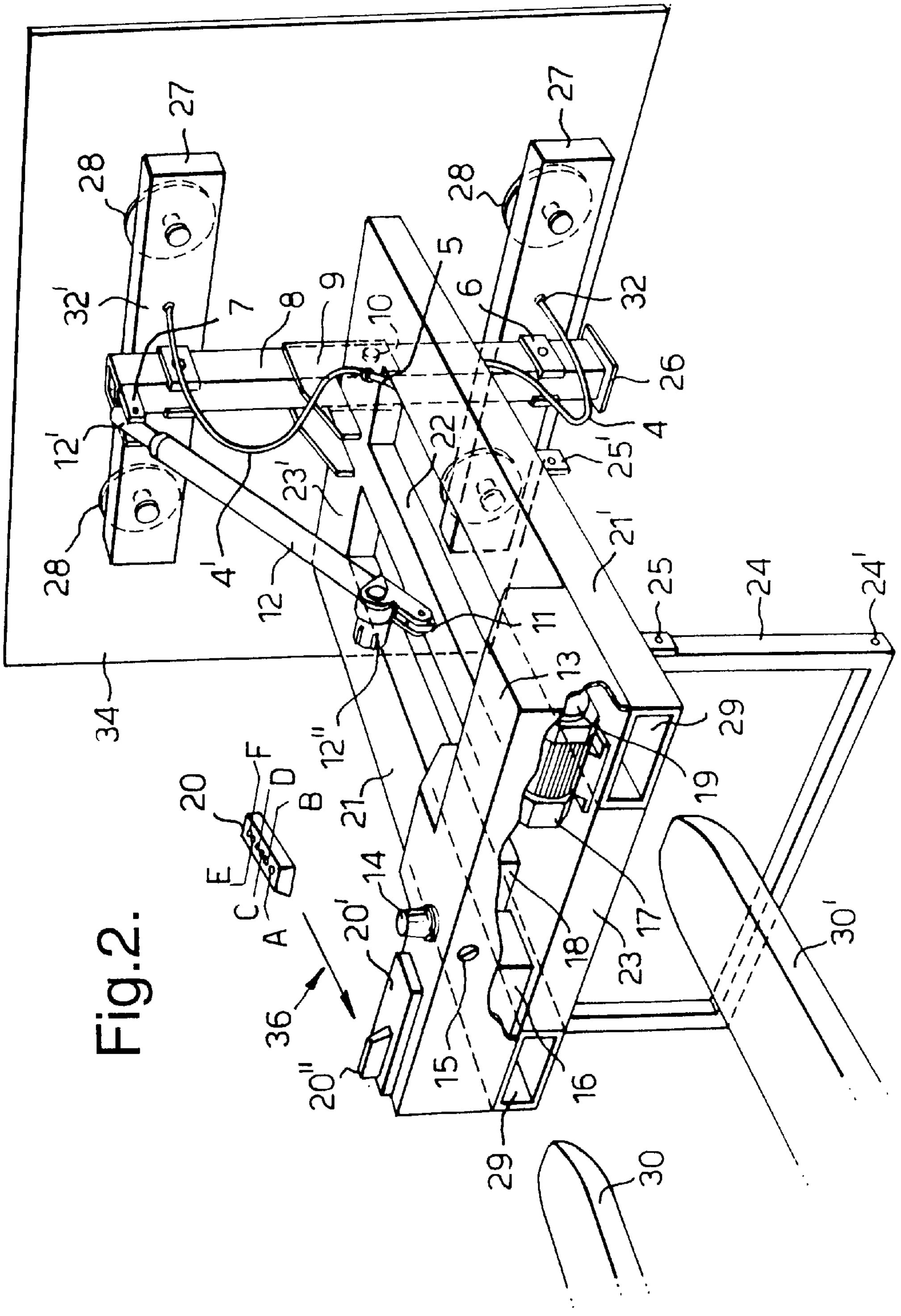
FIG. 2 shows a modification of the embodiment in FIG. 1.

The valve opening caused by the return spring is coupled by means of a flexible tube 4, 4' to the suction plates or suction cups, designated by the reference numeral 2 in FIG. 1 and 28 in FIG. 2. A nipple or coupling sleeve 3, 3' (FIG. 1), 32, 32' (FIG. 2) forms the vacuum connection between said flexible tubes and suction plates or suction cups. When the valve 5 is opened by the return spring, the suction plates 2 or suction cups 28 will be subjected to vacuum and grip the article, e.g., a barrel 33 or a plate 34, by suction. In this state the valve 5 is without any power supply. The advantageous solution involving the controllable valve 5 is that it does not use power once the article has been gripped by suction. Consequently, the article can be handled as desired without the vacuum pump 17 and valve having to use any power.

In order to start operating the present device, a start switch A on a control panel 20 must be used. The control panel 20 may be connected to the present device either by means of a cable 35 or by wireless connection, e.g., radio signals or infrared signals, designated by the reference numeral 36. In the last-mentioned case, there will be a signal receiver 20' equipped with a signal detector 20" on the device. The cable 35 or the receiver 20' is connected to electronic or electric equipment which actuates the operation of the vacuum pump 17 and the operation of the valve 5.

When the switch 20A is actuated, the vacuum pump 17 will empty the tubular members 22, 23, 23' of air so that a vacuum state arises therein, i.e., in the vacuum chamber. Normally, the pump 17 will take a short time, e.g., 20 seconds, to produce negative pressure in the vacuum chamber. On operation of the switch 20A, the valve 5 is supplied with power and blocks the vacuum supply to said suction plate 2 or suction cup 28. When a switch 20B on the control panel 20 is actuated, the power to the valve 5 is cut off, whereby vacuum is supplied to the suction plate 2 or suction cup 28, thereby gripping the article by suction to the said suction plate or suction cup. The vacuum pump 17 will, if necessary, ensure that the vacuum state in the vacuum chamber 22, 23, 23' is maintained at a desired level, for example, by running the pump for a short interval in order to sustain the negative pressure. When the fork members 30, 30' on the fork-lift truck 31 are inserted into cavities 29 and 29' in the tubular members 21, 21' of the pallet-like structure, the fork-lift truck will be capable of lifting the device, and with it the article secured by means of vacuum to the device, whereby the truck can transport the article to the desired site, optionally perform the desired task with the article, e.g., the emptying of a barrel. Maintaining the vacuum state that is necessary to grip the article requires in practice only brief periods of operation of the vacuum pump.

As shown in FIG. 1, two arcuate steel plates 2 are used having an angle around the plate, whereby suction plates 2 are formed. Furthermore, on the inside of these plates there is provided a seal 1, e.g., of rubber. Suction plates of this kind belong per se to the state of the art and may be of different shapes, depending upon the type of article that is to be handled. In FIG. 2 it is shown how the suction plates there have been replaced by suction cups 28 which are secured to a support 27, and where the support 27 also serves as a pneumatic connection to each of the suction cups 28. The use of suction cups 28 is especially advantageous in connection with the handling of flat articles such as a plate 34.

As previously mentioned, the flexible tubes 4 and 4' are coupled to a sleeve 3, 3' which forms the connection with the suction plate 2. In the embodiment in FIG. 2, the corresponding sleeves for flexible tube connection are designated by said reference numerals 32 and 32'.

On the control panel 20, according to the embodiment proposed but not limiting for the invention, there are provided six control buttons. The first is 20A and designates a start switch for the vacuum pump 17, and also the valve 5. The switch 20A may have an indicator, e.g., a green light when the desired vacuum has been obtained in the vacuum chamber 22, 23, 23'. Reference numeral 20B denotes a switch for connecting and disconnecting vacuum and is designed to cut off power supply to the valve 5 when depressed, thereby opening for vacuum to the suction surface or suction cup as a result of the return spring of the valve. The suction plates 2 or suction cups 28 will then be capable of being secured by means of vacuum connection to the article. On the other hand, in order to release the article from the suction plate 2 or suction cups 28, the valve 5 must be supplied with power. In this case, two buttons, e.g., the buttons 20E and F, can for instance be pressed at the same time.

Figure 3:
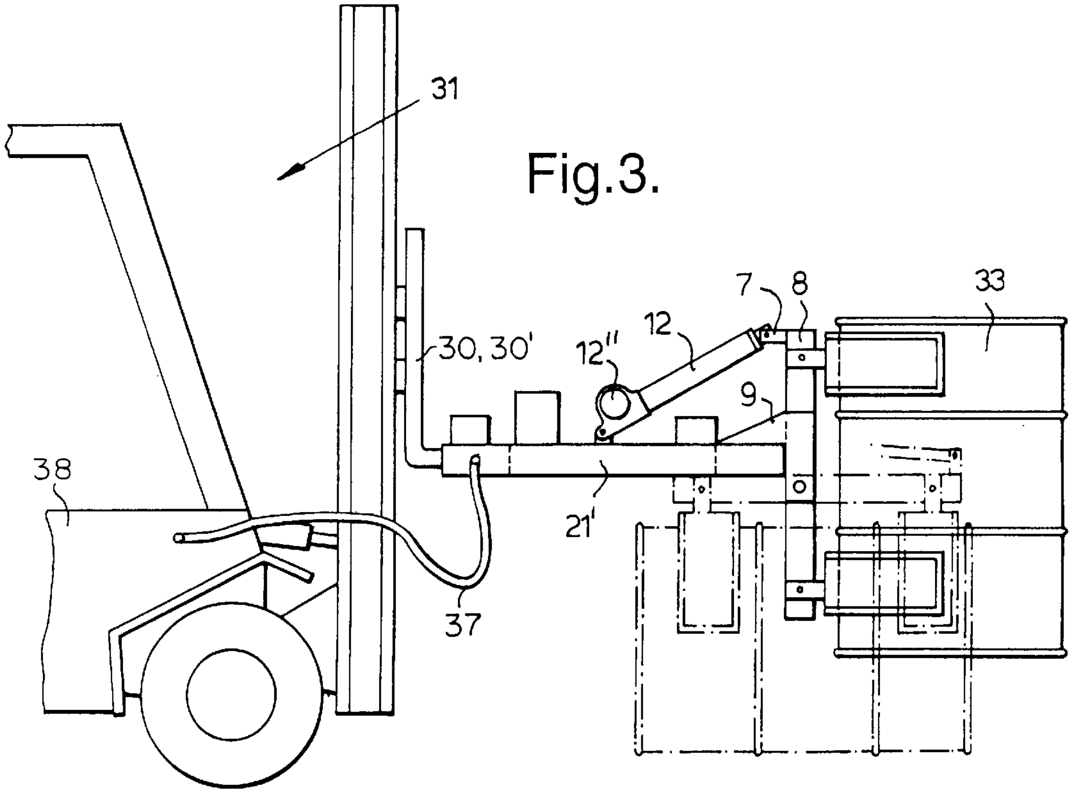
FIG. 3 illustrates the use of the device according to the invention, according to embodiment 1.

As shown in FIG. 1, each of the suction plates 2 can be secured with the aid of a fixing bracket 6 and a bolt to a square tube 8. This attachment may take place in a similar manner in the embodiment shown in FIG. 2, where the suction cups are secured via the support 27 to the square tube 8. The main fixing bracket 9 for the square tube 8 is preferably located in the centre of the tubular member 23'. The square tube 8 is secured by means of a bolt connection 10 in the centre of the bracket 9. On top of the square tube 8 a bracket 7 is provided for pivotal connection with a piston rod 12' in a cylinder structure 12. At the bottom, the cylinder structure 12 is pivotally connected to a bracket 11 on the tubular member 22. With the cylinder 12 between the brackets 7 and 11, the square tube 8 is thus held in a normal vertical position. By pressing, for example, button 20C on the control panel 20, the cylinder will be actuated by a motor 12" causing the piston rod 12' to move outwards, whereby the square tube 8 at the top thereof moves outwards and will be able to position the article, e.g., a barrel, substantially horizontally as shown in FIG. 3. The tubular members 21, 21', 22, 23 and 23' which constitute the frame of the pallet-like structure will thus form the entire foundation for the present device when it is to be used in connection with a fork-lift truck. As mentioned previously, holes or pneumatic connections 22' and 22" are provided in the walls of the tubular members 23 and 23' respectively, the tubular member 22 forming the connection between these holes 22' and 22", whereby a relatively large vacuum chamber of great capacity is obtained.

In the illustrated embodiment as seen from FIGS. 1 and 2, the vacuum pump 17 is located at the end of the pallet-like structure where the insertion openings 29 and 29' are located for the fork members 30 and 30' of the fork-lift truck. Furthermore, a chargeable battery 16 is also provided which is capable of supplying the vacuum pump motor, the valve 5, the motor 12' of the cylinder 12 and an alarm indicator 14, e.g., of optical or audible type, with power.

The vacuum pump 17 is normally equipped with a (non-illustrated) check valve. This valve has the task of closing off vacuum in the vacuum chamber 22,23,23' when the vacuum pump 17 is stopped (when desired vacuum level is obtained) and the valve 5 is closed. By starting the pump 17 with the aid of the switch 20A, the vacuum chamber will be emptied of air and reach desired vacuum state in the course of a short time, e.g., about 20 seconds. A so-called vacustat 19 will monitor the pressure in the vacuum chamber 22, 23, 23'. This vacustat 19 is expediently located between the check valve of the pump 17 and the vacuum chamber 22, 23, 23'. The vacustat 19 will start the vacuum pump 17 when the vacuum level in the vacuum chamber is too low. Depression of the button 20B on the panel 20 will cause the valve 5 to open. The valve 5 is then without power. The suction plates 2 or suction cups 28 will then be filled with vacuum which comes from the vacuum chamber, and will grip the article by suction. The vacustat 19 will, if necessary during this suction gripping period, give a signal to the vacuum pump 17 so that the vacuum chamber is maintained at a nominal negative pressure as much as possible.

To protect the vacuum pump 17 and the accumulator 16 and also a cabinet 18 containing electronic or electric equipment, there is to advantage provided a protective cover 13 over these functional parts. On a surface of the cover 13 a pressure gauge 15 is provided for visual control of sufficient vacuum in the vacuum chamber and in the suction plates or suction cups if these are in function. The electro-cabinet 18 is equipped with a low voltage system, e.g., based on 24 volts direct current. The electro-components used in the case of the present device are known commercial products per se and thus do not require a more detailed description. For instance, the equipment located inside the electro-cabinet may comprise microprocessors, current relays, phase gauges, position gauges, pressure or electrosignal converters and so forth.

When the device according to the invention is not in use, it will be equipped with a parking device. On the underside of the pallet-like structure, i.e., on the underside of the tubular members 21 and 21', attachment lugs 25 are provided for pivotal connection with folding parking legs 24. As soon as the openings 29, 29' in the tubular members 21 and 21' are brought into engagement with the fork members 30, 30' of the fork-lift truck, the parking legs 24 can be folded up and secured. When the parking leg 24 is in a downward position as shown in FIGS. 1 and 2, it will, if necessary, be capable of being locked in this position, e.g., in that the vertical part of the leg structure 24 forms a slightly obtuse angle with the tubular members 21 and 21', so that these extend forward in the direction of the article that is to be manoeuvred. The foremost attachment lug 25' is provided with a hole and in a similar fashion the lowermost part of the leg structure 24 is provided with a hole 24', such that the hole 24' can form an engagement with the hole in the lug 25' with the aid of a locking bolt.

At the bottom of the square tube 8, when this is in a vertical position, there is provided a support plate 26 which can help to support when parking the device of the invention when it is not in use.

Although the functional parts 16, 17 and 18 are shown located close to the insertion openings 29, 29' for the fork members 30, 30' of the fork-lift truck 31, these functional parts, or just some of them, may conceivably be located at other points on the pallet-like structure. Furthermore, it would be advantageous to allow the square tube 8 to be of the same length as the barrel it is to grip. In a similar way, the suction cups should also be located on the support frame 27 in such a way that proper vacuum connection to the plate-shaped article 34 is ensured. In certain cases, especially where the plate 34 is not too rigid, it may be advantageous to allow the suction cup 28 support frame 27 to extend the full length of the plate 34, and optionally provide further suction cups in addition to the four which are shown in FIG. 2.

I claim:

1. A vacuum based lifter device for displacing an article, wherein at least one suction plate or suction cup is designed to be connected to and disconnected from a vacuum source, and wherein the suction plate or suction cup is secured to equipment in order to be able to move it together with or relative to said article which is to be displaced, comprising:

a pallet-like structure into which there can be inserted fork members which are mounted on a working unit, and wherein parts of the structure define a vacuum chamber;

a vacuum source having an electrically driven vacuum pump provided on the pallet-like structure and pneumatically connected to the vacuum chamber, and a mechanically or electrically controllable stop and release valve which is pneumatically coupled between the vacuum chamber and said suction plate or suction cup.

2. A device as disclosed in claim 1, wherein:

the pallet-like structure has first and second tubular members into which the fork members of said working unit can be inserted, third and fourth tubular members connecting respective, adjacent ends of said first and second tubular members, and a fifth tubular member which pneumatically connects said third and fourth tubular members, the vacuum chamber of the vacuum source is defined by said third, fourth and fifth tubular members and is pneumatically connected to the vacuum pump, and a power supply for a motor of the vacuum pump is provided in the form of an accumulator on said structure.

3. A device as disclosed in claim 1, wherein:

the pallet-like structure has first and second tubular members into which the fork members of said working unit can be inserted, third and fourth tubular members connecting respective, adjacent ends of said first and second tubular members, and a fifth tubular member which pneumatically connects said third and fourth tubular members, the vacuum chamber of the vacuum source is defined by said third, fourth and fifth tubular members and is pneumatically connected to the vacuum pump, and a power supply for a motor of the vacuum pump is provided by cable connection to the working unit.

4. A device as disclosed in claim 1, further comprising means provided on the pallet-like structure for controlling the operation of a motor for said vacuum pump.

5. A device as disclosed in claim 1, further comprising means provided on the pallet-like structure for controlling said valve.

6. A device as disclosed in claim 1, further comprising:

a hand-operated control device for controlling at least one of said vacuum pump and said valve, and at least one of an electric cable and a wireless communication path for connecting said hand-operated control device to electric or electronic control equipment provided on said pallet like structure.

7. A device as disclosed in claim 6, wherein a wireless communication path is provided using at least one of radio signals and infrared signals.

8. A vacuum based lifter device for displacing an article wherein:

at least one suction plate or suction cup is provided for connection to and disconnection from a vacuum source;

the suction plate or suction cup is secured to equipment in order to be able to move it together with or relative to said article which is to be displaced;

the equipment is secured to a support structure which can be introduced onto fork members that are mounted on a working unit;

the support structure has a pallet-like design;

parts of the structure define a vacuum chamber;

a vacuum source having an electrically driven pump is provided on the pallet-like structure and is pneumatically connected to said vacuum chamber; and a mechanically or electrically controllable stop and release valve is pneumatically coupled between the vacuum chamber and said suction plate or suction cup.

9. A device as disclosed in claim 8 wherein:

the pallet-like structure has first and second tubular members into which the fork members of said working unit can be inserted, third and fourth tubular members connecting respective, adjacent ends of said first and second tubular members, and a fifth tubular member which pneumatically connects said third and fourth tubular members, the vacuum chamber of said vacuum source is defined by said third, fourth and fifth tubular members and is pneumatically connected to the vacuum pump, and a power supply for a motor of the vacuum pump is provided in the form of an accumulator on said structure.

10. A device as disclosed in claim 8 wherein:

the pallet-like structure has first and second tubular members into which the fork members of said working unit can be inserted, third and fourth tubular members connecting respective, adjacent ends of said first and second tubular members, and a fifth tubular member which pneumatically connects said third and fourth tubular members, the vacuum chamber of said vacuum source is defined by said third, fourth and fifth tubular members and is pneumatically connected to the vacuum pump, and a power supply for a motor of the vacuum pump is provided by cable connection to the working unit.

11. A device as disclosed in claim 8, further comprising means provided on the pallet-like structure for controlling the operation of a motor for said vacuum pump.

12. A device as disclosed in claim 8, further comprising means provided on the pallet-like structure for controlling said valve.

13. A device as disclosed in claim 8, further comprising:

a hand-operated control device for controlling at least one of said vacuum pump and said valve, and at least one of an electric cable and a wireless communication path for connecting said hand-operated control device to electric or electronic control equipment provided on said pallet like structure.

14. A device as disclosed in claim 13, wherein a wireless communication path is provided using at least one of radio signals and infrared signals.

* * * * *